(12) United States Patent
Bain et al.

(10) Patent No.: US 9,288,647 B2
(45) Date of Patent: Mar. 15, 2016

(54) METHOD FOR SENDING CONTACT NOTE DURING CALL ESTABLISHMENT

(71) Applicant: Verizon Patent and Licensing Inc., Arlington, VA (US)

(72) Inventors: Alice Yuan Bain, Morristown, NJ (US); William Andrew Fish, Bedminster, NJ (US); Andrew Wahlon Lam, River Edge, NJ (US); Lin Song, Newton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/454,859

(22) Filed: Aug. 8, 2014

(65) Prior Publication Data
US 2016/0044475 A1    Feb. 11, 2016

(51) Int. Cl.
*H04W 4/16* (2009.01)
*H04L 29/08* (2006.01)
*H04M 3/42* (2006.01)

(52) U.S. Cl.
CPC .............. *H04W 4/16* (2013.01); *H04L 67/306* (2013.01); *H04M 3/42* (2013.01)

(58) Field of Classification Search
CPC ......... H04W 4/16; H04L 67/306; H04M 3/42
USPC .................................... 455/414, 436, 414.1
See application file for complete search history.

(56) References Cited

U.S. PATENT DOCUMENTS

| | | | | |
|---|---|---|---|---|
| 8,918,465 | B2* | 12/2014 | Barak | G06Q 30/0609 709/205 |
| 2007/0022437 | A1* | 1/2007 | Gerken | H04N 7/17318 725/41 |
| 2012/0089732 | A1* | 4/2012 | Clark | G06Q 10/10 709/225 |
| 2014/0295798 | A1* | 10/2014 | Roach, Jr. | H04L 63/0407 455/411 |

* cited by examiner

*Primary Examiner* — Qutbuddin Ghulamali

(57) ABSTRACT

A note data message is associated with a first user equipment (UE) device and is sent to a second UE device when the second UE device communicates with the first UE device. The note data message is received and stored in a network server. A request is received from the second UE device to establish a communication session with the first UE device. If the first UE device has authorized the sending of the message to the second device, the note data message is sent to the second UE device independent of any communication session established between the first and second UE devices.

20 Claims, 5 Drawing Sheets

METHOD FOR SENDING CONTACT NOTE DURING CALL ESTABLISHMENT

BACKGROUND

The status of end-users of a communication system may be an important piece of information. It may be useful, for example for a calling party to know whether a called party is unable to answer a call because she is asleep or driving. In addition, it may be useful to know whether the called party is at work and unable to take personal calls or in a meeting and will be able to take calls after a specified time. Currently, there is no way for a calling party to know the status of the called party without actually speaking to them. Similarly, a calling party may want to inform the called party of his status. For example the calling party may be about to board an airplane and be unavailable for several hours. Status information may also be valuable for other types of communication. For example, it may be useful for a party sending a short messaging system (SMS) message to another party to know that the other party is currently unable to respond.

Hence, there is a need for a user of a communication system to be able to inform other users of their current status.

DETAILED DESCRIPTION OF PREFERRED EMBODIMENTS

Figure 1:
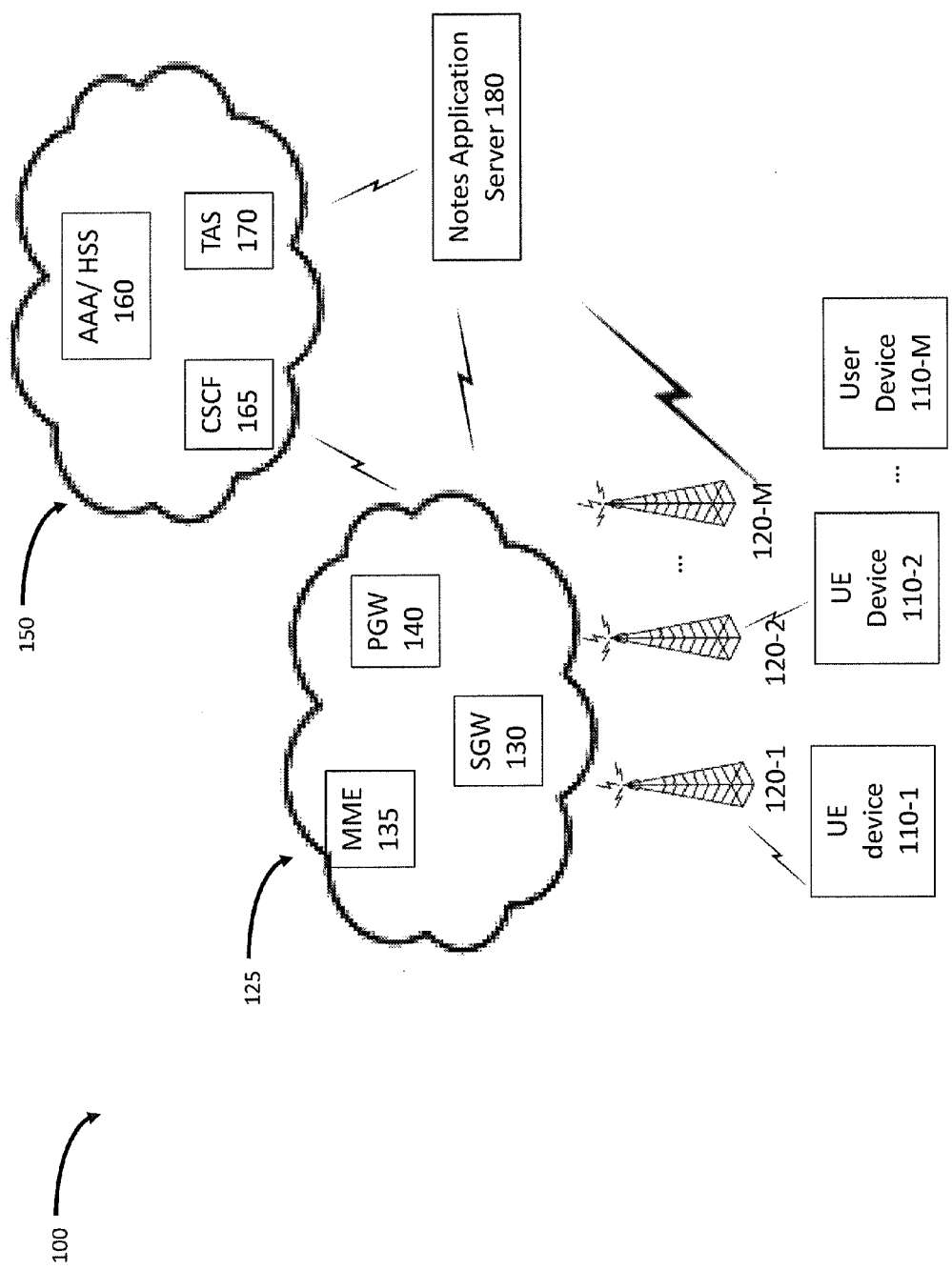
FIG. 1 is a diagram of an example environment in which systems and/or methods described herein may be implemented.

The following detailed description refers to the accompanying drawings. The same labels and/or reference numbers in different drawings may identify the same or similar elements. Also, the following detailed description does not limit the invention.

In one or more implementations, devices may be used to control the delivery of note data from a notes application server to a user equipment (UE) device using a wireless or a wired network. The note data may include the current status of a calling or called party. Alternatively, the note data may include a message or sound signal that the party wants to send with or in response a request to communicate with the called or calling party.

The terms "delivery of note data", "note data delivery", "sending of note data" or "sharing of note data" as used herein, is to be broadly interpreted to include data flow from a server, for example, a notes application server, to a UE device via a wireless network. The sending of note data may comprise delivery of compressed, uncompressed and/or encoded audio data, compressed, uncompressed and/or encoded video data, or other multimedia data, including text data, program code, data files, location coordinates, etc.

By way of example, but not limited thereto, within a wireless network for example, a Long Term Evolution (LTE) network, delivery of note data may permit data flow from a server or a group of servers through one or more wireless nodes, for example, one or more evolved node B (eNB) to serving devices such as, UE devices. This data flow may or may not traverse higher layers of the LTE network. It will be appreciated, however, that delivery of note data may be applicable to networks other than LTE. In this regard, the term "network," as used herein, is intended to be broadly interpreted to include a wired or wireless network, for example, mobile network, cellular network and non-cellular network. By way of example, but not limited thereto, delivery of note data may be performed in a variety of network types, such as, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, an Evolution Data Optimized (EV-DO) network, and/or another type of wireless network or via a wired network.

Depending on the type of wireless network, note data delivery may be performed by wireless nodes not specifically described herein that provide corresponding functionality. By way of example, but not limited thereto, delivery of note data may be performed by a base station (BS), a base station controller (BSC), an eNB, a network access device, a serving GPRS support node (SGSN), etc.

Presently, several instant messaging services are available on the public Internet®. The list of most popular ones include, WINDOWS® Live Messenger, AOL Instant Messenger, YAHOO® Messenger, GOOGLE® Talk and SKYPE®. Instant messaging increases communication and provides easier collaboration among users. On most systems, a user can set an online status or an away message to let peers know whether the user is available, busy, or not present at the computer. The statuses or note data, however, are shared with other users at all times, as the user sets the status in the network. The note data is not shared when the user is being contacted, for example, upon being called by a calling party. Consequently, it may be beneficial for the network operator to provide a facility in which note data associated with a user is fetched when the user is contacted by another user.

In an exemplary embodiment, with reference to FIG. 1, UE device 110-2 uploads note data to the notes application server 180. UE device 110-1 initiates a communication session with the UE device 110-2 via networks 125 and 150. Telephony Application server (TAS) 170 receives a request to establish a communication session between devices 110-1 and 110-2 and determines whether any note data is associated with the UE device 110-2. Particularly, upon receiving the request for the communication session from the UE device 110-1 and upon determination that the UE device 110-2 has uploaded note data, TAS 170 instructs the notes application server 180 to send the note data to the UE device 110-1 independent of the establishment of the communication session.

Further with reference to FIG. 1, in one implementation, network environment 100 may include wireless network 125 that uses the $3^{rd}$ generation (3G) mobile telecommunications standards and/or the $4^{th}$ generation (4G) or later mobile telecommunications standards. In another implementation, network 125 may be an evolved packet system (EPS) that includes a LTE network and/or an evolved packet core (EPC) that operates based on a 3GPP wireless communication standard. The LTE network may be a radio access network (RAN) that includes one or more small base stations which take the form of eNBs 120. The EPC may include serving gateway (SGW) 130, mobile management entity (MME) 135, and/or packet data network gateway (PGW) 140 that enable UE devices 110 to receive and send note data (e.g., from notes application server 180), using unicast/multicast transmissions, and/or via an Internet protocol (IP) multimedia subsystem (IMS) network 150.

SGW 130 may include one or more computation or communication devices that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 130 may aggregate traffic received from one or more base stations associated with the LTE network, and may send the aggregated traffic to the notes application server 180, for example, via PGW 140, network devices of network 150, and/or other network devices associated with the EPC. SGW 130 may also receive traffic from the other network devices and/or may send the received traffic from notes application server 180 to and from UE devices 110 via base stations 120. SGW 130 may perform operations associated with handing-off UE devices 110 from and/or to other base stations in the LTE network.

MME 135 may include one or more computation or communication devices that gather, process, search, store, and/or provide information in a manner described herein. For example, MME 135 may perform operations associated with handing off UE device 110, from one base station to another. For example, MME 135 may perform operations associated with handing off the UE device 110-1, from a first base station 120-1 to a second base station 120-2, when the UE device 110-1 is entering the geographic area of the second base station 120-2. MME 135 may, in yet another example, perform an operation to handoff the UE device 110-1 from the second base station 120-2 to the first base station 120-1, when the UE device 110-1 is entering the geographic area associated with first base station 120-1. MME 135 may also interface with the Authentication, Authorization, and Accounting/Home Subscriber Server (AAA/HSS) 160 to provide authentication, authorization and accounting services for the network 125.

PGW 140 may include one or more computation or communication devices that gather, process, search, store, and/or provide information in a manner described herein. PGW 140 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 140 may include a device that aggregates traffic received from one or more SGWs, and may send the aggregated traffic to notes application server 180 or other network devices of network 150. In another example implementation, PGW 140 may receive traffic from notes application server 180 and may send the traffic toward one of the UE devices 110 via SGW 130.

IMS network 150 may include an architectural framework or network, for providing a variety of communication network services, such as registration services, authentication services, authorization services, call session control services, and other types of communication services. IMS network, for example, includes a telecommunications network for delivering IP multimedia services. IMS network 150 may include communication session control function (CSCF) server 165, AAA/HSS 160 and TAS 170.

AAA/HSS 160 may include one or more devices that gather, process, search, store, and/or provide information in a manner described herein. For example, AAA/HSS 160 may manage, update, and/or store, in a memory for an AAA/HSS, profile, associated with a UE device 110. This data identifies applications and/or services that are permitted for and/or are accessible by UE devices 110; information associated with a user of UE device 110 (e.g., a username, a password, a personal identification number (PIN), etc.); rate information; minutes allowed; and/or other information. Additionally, or alternatively, AAA/HSS 160 may perform authentication, authorization, and/or accounting operations associated with communication sessions with user devices 110. MME 135 may receive authorization from AAA/HSS 160, in response to a communication establishment request from the user devices 110, before the MME 135 creates and stores a context for the user devices 110.

CSCF 165 may include one or more computation or communication devices that gather, process, search, or provide information in a manner described herein. In one implementation, CSCF 165 may generate and/or extract session information and may provide the session information to TAS 170. For example, CSCF 165 may be a central component for signaling and control within IMS network 150. CSCF 165 may be responsible for signaling with TAS 170 via session initiation protocol (SIP).

CSCF 165 may provide a first point of contact for UE devices 110 accessing network 150 and may also provide proxy services for the UE devices that are registered with the network 150. In one example, UE device 110 may attach to the CSCF 165 prior to registering with network 150 and/or initiating a communication session. In another example, during registration of a UE device 110 with network 150, the CSCF 165 communicates with the AAA/HSS 160, to obtain profile information for the UE device 110 accessing the network 150.

In addition, CSCF 165 may route communication messages within network 150 and/or establish routing paths for session requests and/or communication sessions.

TAS 170 may include one or more of a variety of computing devices, including a computer, a server, a cluster of servers, or one or more other types of computing or communication devices. TAS 170 may include a back-to-back SIP user agent capable of maintaining call states. Additionally, or alternatively, TAS 170 may provide telephony services that are not directly related to routing network messages. For example, TAS 170 may provide services, such as call waiting, call forwarding, call conferencing, or other types of services relating to telephony services.

In one implementation, TAS 170 includes a data communication interface for packet data communication related to note data. TAS 170 also includes a central processing unit, in the form of one or more processors, for executing program instructions to facilitate sharing of note data. TAS 170 includes an internal communication bus, program storage and data storage for various data files to be processed and/or communicated by TAS 170, although TAS 170 often receives programming and data via network communications. The hardware elements and operating system of TAS 170 are conventional in nature. The server functions of TAS 170 may be implemented in a distributed fashion on a number of similar platforms, to distribute the processing load.

In one example, TAS 170 may perform digit analysis and call processing associated with calls from/to subscribers, such as a subscriber associated with user devices 110. Additionally, TAS 170 may perform "lookup" procedures to the AAA/HSS 160 to download subscriber profile of user devices 110 and process calls from/to the user devices 110 based on the subscriber profile. TAS 170 also interfaces with a notes application server 180 to store and retrieve user messages, as described below.

As shown in FIG. 1, network environment 100 may include multiple UE devices 110-1, 110-2, ..., 110-M (where M≥1) (referred to collectively herein as UE devices 110 and individually as UE device 110). In the example, the UE devices 110 obtain note data over-the-air via a number of base stations. Hence, the environment 100 also includes base stations 120-1, ..., 120-N (where N≥1) (referred to collectively herein as "base stations 120" and individually as "base station 120").

UE device 110 may include any computation or communication device, such as a wireless mobile communication device that is capable of communicating with base station and/or a server (e.g., notes application server 180, TAS 170). Examples of the UE device 110 include a laptop computer, a tablet computer, desktop computer, local server, radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a camera, a personal gaming system, or another type of computation or communication device including mobile devices. UE devices 110 may send traffic to and/or receive traffic from notes application server 180. UE devices are programmed with applications (Apps) that access and/or store note data via wired and/or wireless network. An example UE device 110 may have multiple Apps running at a given time and, thus, may access and store multiple note data at the same time.

A mobile device type UE device may include data communication interface, main memory and one or more mass storage devices for storing note data and various executable programs. The UE device 110 may include a physical or virtual keyboard and a cursor control/selection device such as a mouse, trackball, joystick or touchpad for various user inputs, and a display for visual outputs. The UE device 110 may include a microphone and a speaker to enable audio input and output. Some UE devices may utilize touch sensitive display screens, instead of separate keyboard and cursor control elements.

Figure 3:
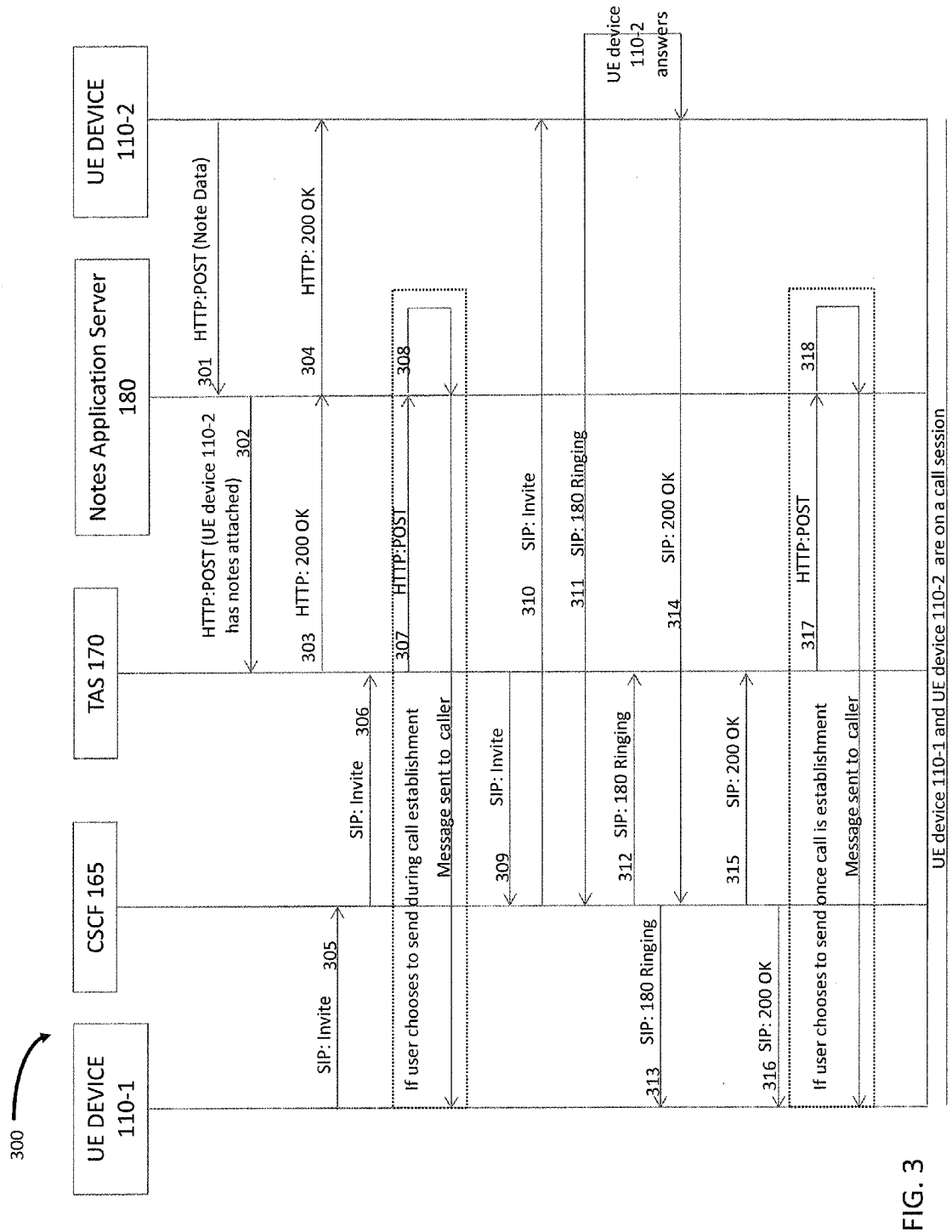
FIG. 3 is a flow-chart diagram of example processes executed by a network server to facilitate sharing of note data between two example user devices according to one or more implementations described herein.
Figure 4:
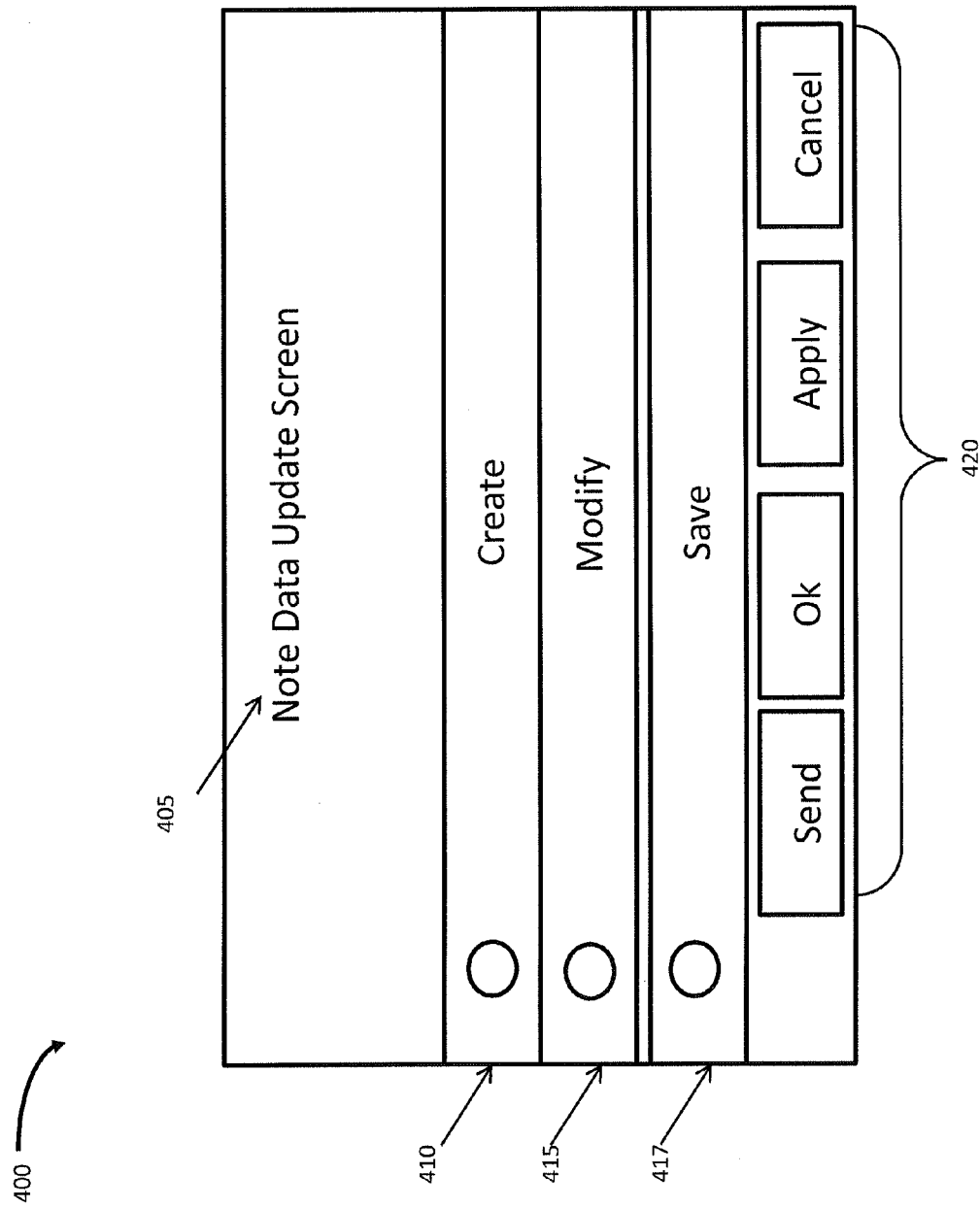
FIG. 4 is a diagram of an example user interface of a user device to facilitate execution of various example processes of FIG. 3.

With reference to FIG. 4, the UE device 110 may include a graphical user interface (GUI) that may be displayed on the display of the UE device 110, while the various operations and processes related to the UE devices, as shown in FIG. 3, are performed. The GUI may include visual components such as a title 405 "Note Data Update Screen", note data update items 410, 415, 417 and execution buttons 420. Although FIG. 4 depicts example visual components of user interface 400, in other implementations, user interface 400 may include fewer visual components, additional visual components, different visual components, or differently visual arranged components than illustrated in FIG. 4. For example, update items 410, 415 and 417 may be presented in a different manner (e.g., as icons, differently colored text items, etc.).

Title 405 may serve to inform a user of UE device 110 that the user has the option of generating or updating note data. Title 405 may include different, fewer, or additional words than those shown in FIG. 4.

User interface 400 may also include note data update items 410, 415 and 417. For example, a user of the UE device 110-2 may create a note data entry by selecting the create item 410. Alternatively, the user may modify an existing note data entry by selecting the modify item 415. In another example, a user of the UE device 110-1, upon entering or modifying a note data entry, may save the note data in the UE device 110-1, by selecting the save item 417. Optionally, the user may delete note data by selecting a delete item (not shown).

Each of the update items may include visual indicators that indicate which item has been selected. For example, the selected item may be highlighted, or shaded differently from other visual portions of the screen. Additionally, or alternatively, a radio button next to the selected item may be displayed differently (e.g., shaded, filled, etc.) than a radio button next to the un-selected item. Additionally, or alternatively, a check mark may be displayed in connection with the selected item, while a check mark is not displayed next in connection with the un-selected item. Additionally, or alternatively, other visual cues may be provided that indicate which item is selected. User interface 400 may further include one or more execution buttons 420. Buttons 420 may be used to cancel, accept or apply a selection of an update item. Buttons 420 may also be used to send a selected note data, and/or to navigate from user interface 400 to another GUI (not shown). For example, buttons 420 may include a "Send" button, an "Ok" button, an "Apply" button, and a "Cancel" button. For example, the user of the UE device 110-2 may modify an existing note data by selecting update item 415 and then execute the selection using the "Apply" button and then send the modified note data using the Send button. The user of UE device 110-1 may receive and save the modified note data, by selecting the item 417 and then execute the saving of the note data using the "Ok" button 420. The "Ok" button may save the selection of the updated item and may also navigate away from user interface 400 to another user interface. The "Cancel" button may navigate away from user interface 400, without executing any of the functions of the selected items.

Figure 2:
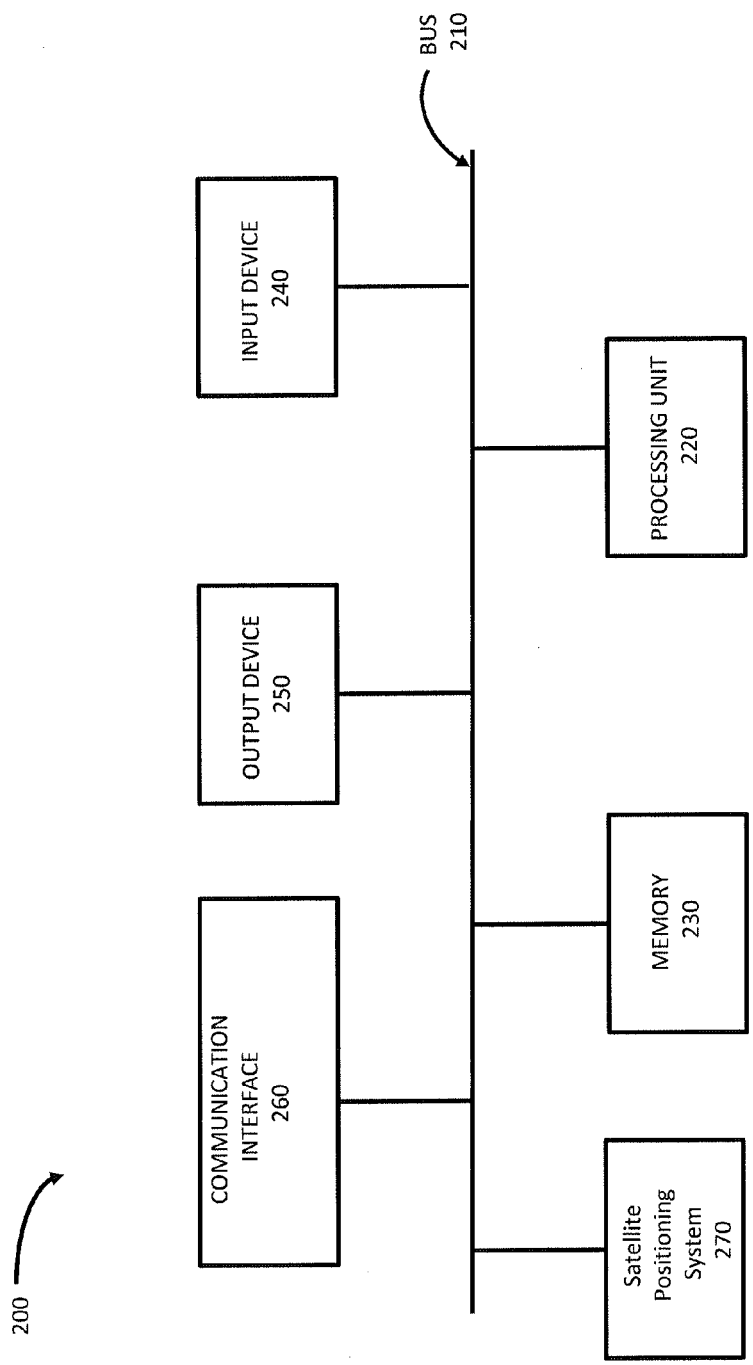
FIG. 2 is a block diagram of example components of a device that may be utilized in the environment of FIG. 1.

FIG. 2 is a diagram of example components of a device 200 according to one or more implementations described herein. As depicted, device 200 may include bus 210, processor 220, memory 230, input device 240, output device 250 and communication interface 260. Also, if the device 200 is a UE device 110, it may include a satellite positioning system (SPS) receiver 270. However, in other implementations, device 200 may include fewer components, additional components, different components, or differently arranged components than those illustrated in FIG. 2.

In certain implementations, a portion or all of device 200 may correspond to one or more of the devices depicted in FIG. 1. For example, device 200 may correspond to UE device 110, SGW 130, MME 135, PGW 140, CSCF 165, AAA/HSS 160, TAS 170, or notes application server 180. Additionally, each of UE device 110, SGW 130, MME 135, PGW 140, CSCF 165, AAA/HSS 160, TAS 170 or notes application server 180, may include one or more devices 200 or one or more components of device 200 and multiple ones of the UE device 110, SGW 130, MME 135, PGW 140, CSCF 165, AAA/HSS 160, TAS 170 or notes application server 180 may be implemented in a single one of the devices 200.

Bus 210 may include one or more component subsystems and/or communication paths that enable communication among the components of device 200. Processor 220 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 220 may control the overall operation, or a portion thereof, of device 200, based on, for example, an operating system, and/or various applications. Processor 220 may access instructions from memory 230, from other components of device 200, or from a source external to device 200 (e.g., a network or another device).

Memory 230 may include memory and/or secondary storage. For example, memory 230 may include random access memory (RAM), dynamic RAM (DRAM), read-only memory (ROM), programmable ROM (PROM), flash memory, or some other type of memory. Memory 230 may include a hard disk (e.g., a magnetic disk, an optical disk, a magneto-optic disk, a solid state disk, etc.) or some other type of computer-readable medium, along with a corresponding drive. The memory 230 may include computer-readable medium, defined as a non-transitory memory device. A memory device may include space within a single physical memory device or be spread across multiple physical memory devices.

Input device 240 may include one or more components that permit a user to input information into device 200. For example, input device 240 may include a touch-screen, keypad, a button, a switch, a knob, fingerprint recognition logic, retinal scan logic, a web cam, voice recognition logic, a touchpad, an input port, a microphone, a display, or some other type of input component. Output device 250 may include one or more components that permit device 200 to output information to a user. For example, output device 250 may include a display, light-emitting diodes (LEDs), an output port, a speaker, or some other type of output component.

Communication interface 260 may include one or more components that permit device 200 to communicate with other devices or networks. For example, communication interface 260 may include some type optical, wireless or wired interface. Communication interface 230 may also include an antenna (or a set of antennas) that permit wireless communication, such as the transmission and reception of radio frequency (RF) signals in accordance with the applicable standard for wireless communications with base stations.

As described herein, device 200 may perform certain operations in response to processor 220 executing software instructions contained in a computer-readable medium, such as memory 230. The software instructions may be read into memory 230 from another computer-readable medium or from another device via communication interface 260. The software instructions contained in memory 230 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

The SPS receiver 270 is used in some implementations to provide location information to the UE device 110. The processor 220 generates position coordinates, for example, as the identification of the location of the UE device 110. The location information of the UE device 110 is used in the note data associated with the UE device 110, in one example.

Note data may be associated with different applications running on the UE devices 110. For example note data may be associated with an e-mail application, a video conferencing application, a telephone application, a camera application, a video application, a multi-media application, a music player application, a visual voice mail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

In one example, note data is updated by a user of the UE device 110. Updating of the note data may include: establishing an initial note data set, modification, addition, removal of notes in an existing note data set or a substitution of one set of note data of a pre-existing note data set.

In this example, the user edits her contact card in the address book application by attaching a note data item. The attached note data item may be text data, such as a personalized message "I am at work". Furthermore, the user may have turned on a feature on the UE device to share the note data. As such, when another user tries to communicate with the user, the other user receives the "I am at work" message without any intervention from the user of the UE device.

The note data may be stored/updated in the notes application server 180. Note data may be updated manually by a user of the UE device or automatically. Automatic updates may take place periodically, or at a time specified by the user of the UE device. For example, note data may be associated with a GPS-based application that updates a location note data periodically and automatically with the changes of the geographical location of the UE device 110. The automatic update may be triggered based on a change in the location information, such as pre-configured locations in the GPS-based application stored in the UE device 110. In this example, the user may use meta data to set the note data message: "I am at <location>". In this example, the text "<location>" is processed by the UE device 110 when the message is sent and replaced with the current location of the device 110, for example, based on the location of the UE device 110, as determined by a GPS receiver (not shown) internal to the UE device 110. As such, when the user moves from the pre-configured work location to a pre-configured home location, the automatic update includes replacing the "I am at work" message with "I am at home" message.

In another example, note data may not be associated with an application. Note data may be a text message, for example, a short message service (SMS) message generated by the user of the UE device 110, which may or may not be a smartphone. The generated SMS message may be shared with any calling or communicating party, irrespective of the installed applications in the UE device of the calling party. This may be beneficial when the user of the UE device 110 is unable to receive calls, for example because she is asleep and has her UE device turned off.

In one example, note data may be private, based on an indication set by the user. In one example, the user of the UE device 110-2 identifies, to the notes application server 180, recipients who should receive the note data. The notes application server 180 may verify the identified recipients by consulting the AAA/HSS server 160. For example, the notes application server 180 may match the identified recipients in the user profile of the user UE device 110-2, stored in the AAA/HSS server 160. The notes application server 180 may further consult the user profile to determine whether the user of the UE device 110-2 has indicated sharing of the note data with recipients based on the type of note data. For example, notes application server 180 may determine that the user of the UE device 110-2 has identified family members, as the only recipients, to receive note data that are related to the automatic location update message. Whereas, in another example, the notes application server 180 may determine that the user of the UE device 110-2 has identified all recipients, to receive text message indicating that the user is busy. In addition, the notes application server 180 may consult the AAA/

HSS server 160 to determine whether the identified recipients are authorized to receive the note data. Alternatively, the user of the UE device 110-2 may attach the note data to the contact information of the intended recipients, for example in the address book application of the UE device 110-2. The private note data is then shared with the intended recipients, once the recipients try to communicate with the UE device 110-2.

In another example, note data may be public and associated with an application. In this example, the note data may not have any user-specified recipient. As such, the public note data is shared with any calling party that initiates communication with the UE device 110-2 and has the associated application installed in his/her UE device.

In one implementation, note data may be shared at a specific time and date as designated by the user of UE device 110-2. In this implementation, the user generates the note data and specifies the time and date, in addition to a recipient of the note data. For example, the user may attend a business meeting at a specific time and date every month, and wants the specific callers to receive note data indicating "I am at a business meeting" at that specific time and date. The user may override previously specified recipients of the note data based on a change of event. In one implementation, the user may extend the sharing of the note data to all callers by overriding the designated recipients of the note data, for example, when a business meeting is running longer or is canceled.

As described above, note data may be used to alert a calling party. In one implementation, note data may be used for collaboration. For example, during a conference call, moderator of the conference call may generate note data that includes details (e.g., passwords) related to joining the conference call, and specify the participants of the conference call as the recipients of the note data. As such, any of the participants may automatically receive the details, as she calls to join the conference call.

In another example, note data may be used for requesting help during an emergency. For example, the user of the UE device 110-2 may use a panic button on her device to indicate an emergency situation. In addition to dialing an emergency number, the UE device 110-2 may automatically generate an emergency note and post the emergency note in the notes application server 180. In this example, the note data is public and is not associated with any application. Moreover, the note data may be stored as a SMS message. As such, any calling party trying to contact the user of the UE device 110-2, immediately receives the emergency note data as a SMS message, irrespective of an application stored in the device of the calling party.

Figure 5:
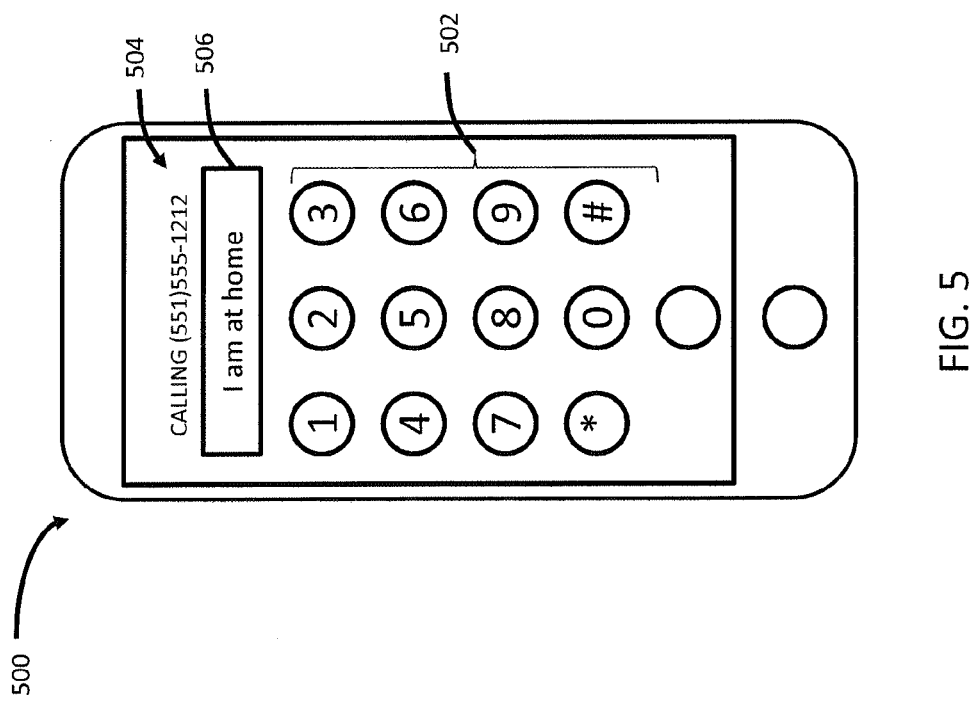
FIG. 5 is a diagram of an example mobile device including a shared note.

FIG. 5 is an example of a user interface that may be presented to the calling party. As shown, the calling party has entered the number (551)555-1212 and initiated the call as indicated by reference 504. Before or after the call is established, note data from the notes application server 180 may be displayed on the calling party's device in the block 506 indicating that the called party is at home.

Notes application server 180 may include one or more server devices capable of storing and/or providing note data to user devices 110. In one implementation notes application server 180 receives requests from UE devices 110 to store note data. Notes application server 180 further stores address books that include contact information of the users of the UE devices 110.

Notes application server 180 may facilitate the sharing of note data among UE devices 110, upon communicating with TAS 170 and receiving instructions and/or requests from TAS 170. Notes application server 180 may be consulted by TAS 170 when the UE devices 110 initiate communications with each other. It is contemplated that, in one implementation, the notes application server 180 may be implemented as the same system as TAS 170.

In some implementations, the notes application server 180 may provide stored note data to a UE device, for example, the device 110-1, based on a request from the UE device 110-2, and further in response to the instructions received from TAS 170, as described below with reference to FIG. 3. In such implementations, notes application server 180 and TAS 170 are separate entities. In another implementation, notes application server 180 may provide note data without a request from a UE device. For example, notes application server 180 may access stored subscriber information and determine that a user of user device 110 is a subscriber of a particular note data item and/or that the note data is public note data item.

In one implementation, TAS 170 may be configured to control the delivery of note data from one UE device to another, for example, upon determination that UE device 110-1 is initiating a communication session with UE device 110-2.

TAS 170 may be configured to receive an update request message from the notes application server 180, when the user of the UE device 110-2 attaches note data. For example, prior to the initiation of the communication session between the UE devices 110-1 and 110-2, a user of UE device 110-2 stores note data in the notes application server 180. In this instance, the note data is associated with an application running/installed on UE device 110-2. In one example, the note data is an audio file that is associated with a music application running on the UE device 110-2. The user of the UE device 110-2 manually uploads the audio file to the notes application server 180 and further specifies, for example, in a message that the user of the UE device 110-1 is to receive the audio file when she calls UE device 110-2. In one example, the user of the UE device 110-1 receives the audio file, upon calling the UE device 110-2. The audio file may be played automatically if the appropriate application is installed in the UE device 110-1. Alternatively, the user of the UE device 110-1 may manually play the received audio file with any application that supports the format of the audio file. In another example, the user of the UE device 110-1 is in the address book of the UE device 110-2. As such, the audio file is automatically uploaded on the notes application server and associated with UE device 110-1, once the user of the UE device 110-2, selects the user of UE the device 110-1 from the address book as the recipient.

Upon receiving the update request message, TAS 170 may update the subscriber profile of the users of the UE device 110-2. For example, TAS 170 may access the AAA/HSS 160, modifying the user profile to indicate that the user of the UE device 110-2 has attached note data. The TAS 170 may be configured to confirm the update by sending a success message to the notes application server 180. Upon receiving the confirmation, the notes application server 180 forwards the success message to the UE device 110-2 that indicates that the update of the note data has been successfully performed.

In one implementation, TAS 170 updates the attached note information only upon receiving a request to communicate with the UE device 110-2 from the UE device 110-1. In such an implementation, TAS 170 only communicates with the notes application server when the request for the communication session with the UE device 110-2 is received by TAS 170.

In addition, TAS 170 may determine whether the recipient of the note data has the appropriate application installed in his/her UE device. For example, TAS 170 first determines the application associated with the attached note data and, then consults the HSS/AAA 160 to further determine whether the recipient of the UE device 110-1 has the application installed. In one example, TAS 170 sends an alert message to the UE device 110-2 upon determining that the recipient UE device 110-1 does not have the application installed.

The TAS 170 may check the note data stored by the user of the UE device 110-2. The TAS 170 may access the AAA/HSS 160 to determine if the user of device 110-2 has indicated any pre-authorized recipients for the stored note data. In one example, TAS 170 performs this operation even when the note data is public. It is contemplated that the verification function performed by TAS 170 may enhance the security of the note data, as the user may, by mistake, forget to indicate a recipient. In addition, TAS 170 may request the user to verify that the note data is indeed public note data. The request for the verification may be sent to the user during and/or after sending the success message confirming the update of the note data.

In another implementation, TAS 170 is configured to determine when to send the note data to the recipient or calling party, for example, based on a time and date specified in the note data. In one example, during the initiation of the communication session by the UE device 110-1, TAS 170 receives a communication session request message from the UE device 110-1 via the CSCF 165. Upon receiving the request, TAS 170 accesses AAA/HSS 160 to determine if the UE device 110-2 has authorized sending the note data during the establishment of the communication session. For example, TAS 170 may determine that the user of the UE device 110-2 has authorized sending the note data to the designated recipient during call establishment. Thus, the UE device 110-1 may receive the note data even if the UE device 110-2 rejects the call.

The TAS 170 then sends a request to the notes application server 180 to send the note data to the recipient (UE device 110-1) during the communication session establishment. The request message may include instructions to send the note data to the UE device 110-1.

In another implementation, TAS 170 determines that the UE device 110-2 has authorized sending of the note data after the communication session is established. As such, TAS 170 processes the request message to establish the communication session, as described in detail with reference to FIG. 3. It is contemplated that, a user of the UE device 110-1 may select to share note data during a call establishment or after the call establishment based on time, location or the calling party. For example, the user may select to share the note data during the call establishment when the UE device is turned off or disabled, for example, while driving, during office hours, while at a family vacation, or during sleeping hours. Whereas, the user may select to share note data after call establishment, for example, when the user wants to screen the caller for example, during weekend hours.

In one example, TAS 170 is configured to charge billing accounts of the users of the UE devices 110-1 and 110-2 for sharing the note data, upon determining that the UE devices 110-1 and 110-2 have the note data sharing feature turned on. In this example, TAS 170 consults with the AAA/HSS 160 to perform the determination by looking up the user profiles associated with the UE devices 110-1 and 110-2. The note data sharing feature may be turned on when the users of the UE devices select to share the note data during the call establishment. In another example, TAS 170 charges the accounts of one or both of the devices on a per note basis.

In yet another implementation, TAS 170 may be configured to identify the type of note data that is stored in the notes application server 180, and further to monitor the update of the identified note data. TAS 170 may determine that the note data is meta data that indicates and/or includes location information, such as coordinate positions, of the user of the UE device 110-2, where the note data is to be updated as the user moves from one geographic location to another. For example, the user uses "<location>" as the meta data in the note data: "I am at <location>", where the "<location>" is automatically replaced by the current coordinate positions of the UE device 110-2 or by a name, such as "home" or "work" associated with the determined coordinate position, as described above. Upon the determination, TAS 170 then periodically requests the notes application server 180 to send the most recent updated location information of the UE device 110-2 when a calling party calls the UE device 110-2. Alternatively, TAS 170 may directly query the UE device 110-2 for the most current position information upon receiving a request for a communication session with the UE device 110-2. TAS 170 may perform the query prior to the establishment of the call, or alternatively, after the establishment of the call. Location information is substituted for the meta data item in the note and the modified note is sent to the UE device 110-1.

FIG. 3 is an exemplary call-flow diagram describing a communication between the user device (UE) device 110-1 and the UE device 110-2 for communicating note data. In this example, UE device 110-2 uploads the note data to a note application server, a user of the UE device 110-1 calls UE device 110-2 and then receives the note data.

At step 301, user of the 110-2 uploads the note data to the notes application server 180. For example, the note data may be a text message, an image or a video file, location coordinates, etc. Note data, in general, may be in HTTP or SMS format.

As described above, appropriate applications may be installed in the UE device 110-1 and UE device 110-2, so that the note data may be stored into the notes application server 180 and so that the stored note data may be communicated between the UE devices.

In one example, an application, installed in the UE device 110-2, detects that the user of the UE device 110-2 is driving, and automatically sends a request message to the notes application server 180 to store or post a note indicating that the user is driving. The request also notifies TAS 170 of the note data for the UE device 110-2 so that TAS 170 can control the delivery of the posted note data when a calling party initiates communication with the UE device 110-2. A caller, such as the user of the UE device 110-1, upon calling the UE device 110-2 and receiving the note data, may decide to continue calling or try again later. The called party may receive visual, auditory and/or tactile feedback (such as a chime or other notification) that the note data has been sent to the calling party.

In one example, the user of the UE device 110-2 sends a request, using an HTTP:POST message, to store the note data in the note application server 180. The note data is associated with the user. As described above, the note data may or may not specify a recipient.

Upon receiving the message from the UE device 110-2, at step 302, the notes application server 180 sends an HTTP:POST request message to TAS 170. For example, the message requests that TAS update the information to indicate that the user of UE device 110-2 has new note data in the notes application server. In one implementation, TAS updates subscriber profile of the user of the UE device 110-2 to indicate that the user of the UE device 110-2 has attached note data.

It is contemplated that TAS 170 may determine whether the user of the UE device 110-2 is authorized to store note data. For example, the user of the UE device 110-2 may have the application installed in her device for storing the note data in the notes application server but may not have subscribed to the note data service. The TAS 170 may then send a message to the UE device 110-2 that requests the user to authorize payment for the service before storing the note data. In response, the user of the UE device 110-2 may authorize payment for different level of services related to the storing of the note data. For example, the user may authorize payment for storing note data that may be shared with all callers or certain group of callers. It is further contemplated that the user may authorize the payment based on a type of note data. For example, the user may authorize payment for storage of text messages, but may not authorize payment for storage of images and videos, or other private information, such as location information of the user.

At step 303, TAS 170, in response, sends a HTTP: 200 OK message to the notes application server 180 indicating that it has successfully received and updated the message and the attached note data At step 304, the note application server then forwards the 200 OK message to the UE device 110-2. The forwarded message indicates that the note has been attached to the UE device 110-2.

At step 305, the user of the UE device 110-1 may send a SIP invite message to the CSCF 165 to establish a communication session with the UE device 110-2. The SIP invite message may include the address of the UE device 110-2, for example.

At step 306, CSCF 165 forwards the SIP invite message to TAS 170. Upon receiving the SIP invite, the TAS 170 determines whether UE device 110-2 has stored any notes in the notes application server 180. In one example, TAS 170 may determine that UE device 110-2 has stored notes based on the information it received in step 302. TAS 170 may also determine if a recipient of the note data has been specified.

It is contemplated that, in one implementation, TAS 170 may not determine whether any note data is associated with UE device 110-2 based on the function being performed. For example, TAS 170 may receive a voice mail forwarding request from UE device 110-1 to UE device 110-2. In such an instance, TAS 170 may not check for association of note data with UE device 110-2.

The TAS 170 may be configured to determine that the user of the UE device 110-2 has authorized sending the note during call establishment. The TAS 170 communicates with AAA/HSS 160 and downloads the subscriber profile of the user of the UE device 110-2 in order to perform the determination. In another implementation, TAS 170 may use a default subscriber profile that is configured by the network operator. At step 307, TAS 170 communicates with the notes application server 180 and requests that the attached note be sent the user of the UE device 110-1.

Alternatively, TAS 170 may determine that the user of the UE device 110-2 has not authorized sending the note during the call establishment. TAS 170 then processes the SIP invite message to establish the communication session requested by UE device 110-1. In this example, TAS 170 sends the SIP invite message to the CSCF 165, which, in turn, forwards it to the user of the UE device 110-2 (steps 309 and 310).

At step 311, a SIP 180 ringing message may be sent to the CSCF 165 from the user device 110-2, in response to the SIP invite message received at step 310, by the UE device 110-2. The message indicates that the UE device 110-2 has received the SIP invite message and is alerting the user of the call.

At steps 312-313, upon receiving the SIP 180 ringing message, CSCF 165 forwards the received SIP 180 ringing message to TAS 170 and to the UE device 110-1, respectively.

The user of device 110-2 answers the call and indicates that the request for establishing the call was successful. For example, at step 314, the UE device 110-2 may send a SIP 200 OK message to the CSCF 165. Upon receiving the success message, similar to steps 312 and 313, the CSCF 165 forwards the SIP 200 OK message to TAS 170 (step 315) and to the UE device 110-1 (step 316). A call session may then be established between the UE device 110-1 and the UE device 110-2.

Upon receiving the SIP 200 OK message indicating that the call has been established, TAS 170 requests that the note application server, at step 317, send the note data associated with the UE device 110-2 to the device 110-1. At step 318, note application server then sends the note data to the UE device 110-1.

It is noted that example programs shown in FIG. 3 may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

As shown by the above discussion, functions relating to the delivery of note data may be implemented on computers connected for data communication via the components of a packet data network, operating as the various servers as shown in FIG. 1. Although special purpose devices may be used, such devices also may be implemented using one or more hardware platforms intended to represent a general class of data processing device commonly used to run "server" programming so as to implement the delivery of note data functions discussed above, albeit with an appropriate network connection for data communication. Other aspects of the note data delivery may involve or be implemented on user terminal devices, such as smartphones tablets or personal computers configured as the client devices as shown in FIG. 1.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for the note data sharing service. The software code is executable by the general-purpose computer that functions as a server and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for sending note data, in essentially the manner performed in the implementations discussed and illustrated herein.

Aspects of the note data sharing methods outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. As used herein, unless restricted to non-transitory, tangible "storage" media, terms such as computer or machine "readable medium" refer to any medium that participates in providing instructions to a processor for execution.

Non-volatile storage media include, for example, optical or magnetic disks, such as any of the storage devices in any computer(s) or the like, such as may be used to implement the aspects shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge. Many of these forms of non-transitory computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, by a server and from a first user equipment (UE) device, a communication request to establish a communication session with a second UE device;
   determining, by the server, whether the second UE device is associated with a note data message;
   determining, by the server, whether the second UE device has authorized sharing the note data message with the first UE device;
   requesting, by the server and based on the determining whether the second UE device has authorized sharing the note data message with the first UE device, a notes application server to send the note data message to the first UE device,
      wherein the determining whether the second UE device has authorized sharing the note data message and the requesting the notes application server to send the note data message are performed independently of establishment of the communication session between the first UE device and the second UE device;
   receiving, by the server and prior to receiving the communication request from the first UE device, an update request that includes information requesting that the note data message be stored;
   sending, by the server and based on the update request, the note data message to the notes application server for storage;
   updating, by the server, a subscriber profile of a user of the second UE device; and
   sending, by the server, after receiving the update request, and to the notes application server, a response message indicating that the subscriber profile has been updated.

2. The method of claim 1, wherein requesting the notes application server to send the note data message includes providing instructions to the notes application server to send the note data message to the first UE device, during the establishment of the communication session.

3. The method of claim 1, wherein requesting the notes application server to send the note data message includes providing instructions to the notes application server to send the note data message to the first UE device, after the establishment of the communication session.

4. The method of claim 1, wherein determining whether the second UE device is associated with the note data message includes determining that the note data message includes private data and determining whether the second UE device has authorized sharing of the note data message includes determining that the note data message indicates the first UE device as a recipient of the private data.

5. The method of claim 1, wherein determining whether the second UE device is associated with the note data message includes determining that the note data message includes public data and determining whether the second UE device has authorized sharing of the note data message includes determining that the note data message indicates that the note data message is a public note data message.

6. The method of claim 1, further including:
determining that the second UE device and the first UE device include applications for sharing the note data message, after receiving the communication request from the first UE device.

7. The method of claim 1, further including charging an account associated with at least one of the first UE device or the second UE device upon determining that the at least one of the first UE device or the second UE device has a subscription to a note data sharing service.

8. A server comprising:
a network interface, configured to support a first network connection with a first user equipment (UE) device, a second network connection with a second UE device, and a third network connection with a notes application server; and
a processor coupled to the network interface and configured to:
receive, from the first UE device, a communication request to establish a communication session with the second UE device;
determine whether the second UE device is associated with a note data message;
determine whether the second UE device has authorized sharing the note data message with the first UE device;
request, based on the determining whether the second UE device has authorized sharing the note data message with the first UE device, the notes application server to send the note data message to the first UE device,
wherein the determining whether the second UE has authorized sharing the note data message and the requesting the notes application server to send the note data message are performed independently of establishment of the communication session between the first UE device and the second UE device;
receive, prior to receiving the communication request from the first UE device, an update request that includes information requesting that the note data message be stored;
send, based on the update request, the note data message to the notes application server for storage;
update a subscriber profile of a user of the second UE device; and
send, after receiving the update request and to the notes application server, a response message indicating that the subscriber profile has been updated.

9. The server of claim 8, wherein, when requesting the notes application server to send the note data message, the processor is configured to:
provide, to the notes application server, instructions to send the note data message to the first UE device, during the establishment of the communication session.

10. The server of claim 8, wherein, when requesting the notes application server to send the note data message, the processor is configured to:
provide, to the notes application server, instructions to send the note data message to the first UE device, after the establishment of the communication session.

11. The server of claim 8, wherein, when determining whether the second UE device is associated with the note data message, the processor is configured to:
determine that the note data message includes private data; and
when determining whether the second UE device has authorized sharing of the note data message, the processor is configured to:
determine that the note data message indicates the first UE device as a recipient of the private data.

12. The server of claim 8, wherein, when determining whether the second UE device is associated with the note data message, the processor is configured to:
determine that the note data message includes public data; and
when determining whether the second UE device has authorized sharing the note data message, the processor is configured to:
determine whether the note data message indicates that the note data message is a public note data message.

13. The server of claim 8, where the processor is further configured to:
determine that the first UE device and the second UE device include applications for sharing the note data message, after reception of the communication request from the first UE device.

14. The server of claim 8, where the processor is further configured to:
charge an account associated with at least one of the first UE device or the second UE device, upon determination that the at least one of the first UE device or the second UE device has a subscription to a note data sharing service.

15. A non-transitory computer-readable medium storing instructions, the instructions comprising:
one or more instructions that, when executed by one or more processors of a server, cause the one or more processors to:
receive, from a first user equipment (UE) device, a communication request to establish a communication session with a second UE device;
determine whether the second UE device is associated with a note data message;
determine whether the second UE device has authorized sharing the note data message with the first UE device;
request, based on the determining whether the second UE device has authorized sharing the note data message with the first UE device, a notes application server to send the note data message to the first UE device;
wherein the determining whether the second UE has authorized sharing the note data message and the requesting the notes application server to send the note data message are performed independently of establishment of the communication session between the first UE device and the second UE device;

receive, prior to receiving the communication request from the first UE device, an update request that includes information requesting that the note data message be stored;

send, based on the update request, the note data message to the notes application server for storage;

update a subscriber profile of a user of the second UE device; and send, after receiving the update request and to the notes application server, a response message indicating that the subscriber profile has been updated.

16. The non-transitory computer readable medium of claim 15, wherein the one or more instructions that cause the one or more processors to request the notes application server to send the note data message include:

one or more instructions that cause the one or more processors to:

provide, to the notes application server, a command to send the note data message to the first UE device, during the establishment of the communication session.

17. The non-transitory computer readable medium of claim 15, where the one or more instructions that cause the one or more processors to request the notes application server to send the note data message include:

one or more instructions that cause the one or more processors to:

provide, to the notes application server, a command to send the note data message to the first UE device, after the establishment of the communication session.

18. The non-transitory computer readable medium of claim 15, further comprising:

one or more instructions that cause the one or more processors to:

determine that the note data message includes private data; and determine that the note data message identifies the first UE device as a recipient of the private data.

19. The non-transitory computer readable medium of claim 15, further comprising:

one or more instructions that cause the one or more processors to:

determine that the note data message includes public data; and determine that the note data message indicates that the note data message is a public note data message.

20. The non-transitory computer readable medium of claim 15, further comprising:

one or more instructions that cause the one or more processors to:

determine that the first UE device or the second UE device is subscribed to a note data sharing service; and charge an account associated with the first UE device or the second UE device based on upon determining that the first UE device or the second UE device is subscribed to the note data sharing service.

* * * * *